(12) United States Patent
Abkarian et al.

(10) Patent No.: US 6,553,434 B1
(45) Date of Patent: Apr. 22, 2003

(54) PSEUDO MASTER/SLAVE DECOUPLING OF HIGH SPEED BUS COMMUNICATIONS TIMING

(75) Inventors: Alfred Abkarian, Lacrescenta, CA (US); Kiran Munj, Oak Park, CA (US); Harun Muliadi, Thousand Oaks, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 09/369,135

(22) Filed: Aug. 5, 1999

(51) Int. Cl.[7] .................. G06F 13/14; G06F 13/38; G06F 13/42
(52) U.S. Cl. ............... 710/18; 710/19; 710/44; 710/46; 710/47; 710/58; 710/60; 710/61; 709/208
(58) Field of Search ................ 710/18, 19, 46, 710/47, 58, 60, 61, 44; 709/208

(56) References Cited

U.S. PATENT DOCUMENTS

| 4,885,789 | A | * | 12/1989 | Burger et al. ............... 713/164 |
| 5,878,234 | A | * | 3/1999 | Dutkiewicz et al. ......... 395/290 |
| 6,185,643 | B1 | * | 2/2001 | Kirshtein et al. ............ 710/73 |
| 6,260,082 | B1 | * | 7/2001 | Barry et al. ................. 710/22 |
| 6,327,667 | B1 | * | 12/2001 | Hetherington et al. ...... 713/500 |

* cited by examiner

Primary Examiner—Jeffrey Gaffin
Assistant Examiner—Rehana Perveen
(74) Attorney, Agent, or Firm—Blakely, Sokoloff, Taylor & Zafman LLP

(57) ABSTRACT

A system and method of decoupling timing in a high speed bus system. A master/slave translator is coupled between a master device and a slave device. A pseudo slave of the master/slave translator responds to the master in a first timing protocol. A pseudo master of the master/slave translator masters the slave devices under a different timing protocol. The master/slave translator causes the master to believe its communications with the slave device are occurring under the first protocol.

20 Claims, 5 Drawing Sheets

PSEUDO MASTER/SLAVE DECOUPLING OF HIGH SPEED BUS COMMUNICATIONS TIMING

BACKGROUND (1) Field of the Invention

The invention relates to a bus system. More specifically, the invention relates to satisfying timing constraints in high-speed bus systems.

(2) Background

One typical bus configuration is a system having a single master and a plurality of slaves. The master may, for example, go poll every slave to determine whether the slave has something to send to the master or whether the slave can accept something from the master. Depending on their responses to the polling, the master selects among the slaves to send or receive data. One existing bussing protocol that falls within this genre is the Utopia 2 protocol, as set forth in the Utopia Level 2, V 1.0 June 1995 (Utopia 2). Utopia 2 and subsequent revisions are referred to generically herein as "Utopia" protocols. The Utopia 2 system is a synchronous bus system in which the master communicates with the slaves by putting the address on the bus and then the slave having a corresponding address answers with its availability. Utopia 2 is broken down into two separate busses, a transmit bus and a receive bus. If the address is asserted on the receive bus, the answer indicates whether the slave has something to send to the master. If the address is asserted on the transmit bus, the answer indicates whether the slave is capable of receiving something from the master. There is a limited window after the assertion of the address within which the slave must answer. As clock speed increases, this window shrinks. For example, a 50 MHz clock implies a clock cycle of 20 ns, and therefore, a window for possible response of 20 ns. This means that the communication must pass between the master and the slave within 20 ns. In certain backplane environments, and any other time when the slave is relatively remote from the master, the propagation delay in the backplane coupled with other factors may cause the time budget for the communication to be exceeded. Typically, the total budget=clock to out+2 buffer delays+propagation delay+target setup+clock skew. At 50 MHz, this must be less than 20 ns for a valid transaction. On, for example, a 21" backplane, the propagation delay alone may be eight ns, thereby absorbing 40% of the total timing budget. As a result, achieving synchronous bus speeds on the order of 50 MHz has been highly problematic in such systems.

BRIEF SUMMARY OF THE INVENTION

A system and method of decoupling timing in a high speed bus system is disclosed. A master/slave translator is coupled between a master device and a slave device. A pseudo slave of the master/slave translator responds to the master in a first timing protocol. A pseudo master of the master/slave translator masters the slave devices under a different timing protocol. The master/slave translator causes the master device to believe its communications with the slave device are occurring under the first protocol.

DETAILED DESCRIPTION

Figure 1:
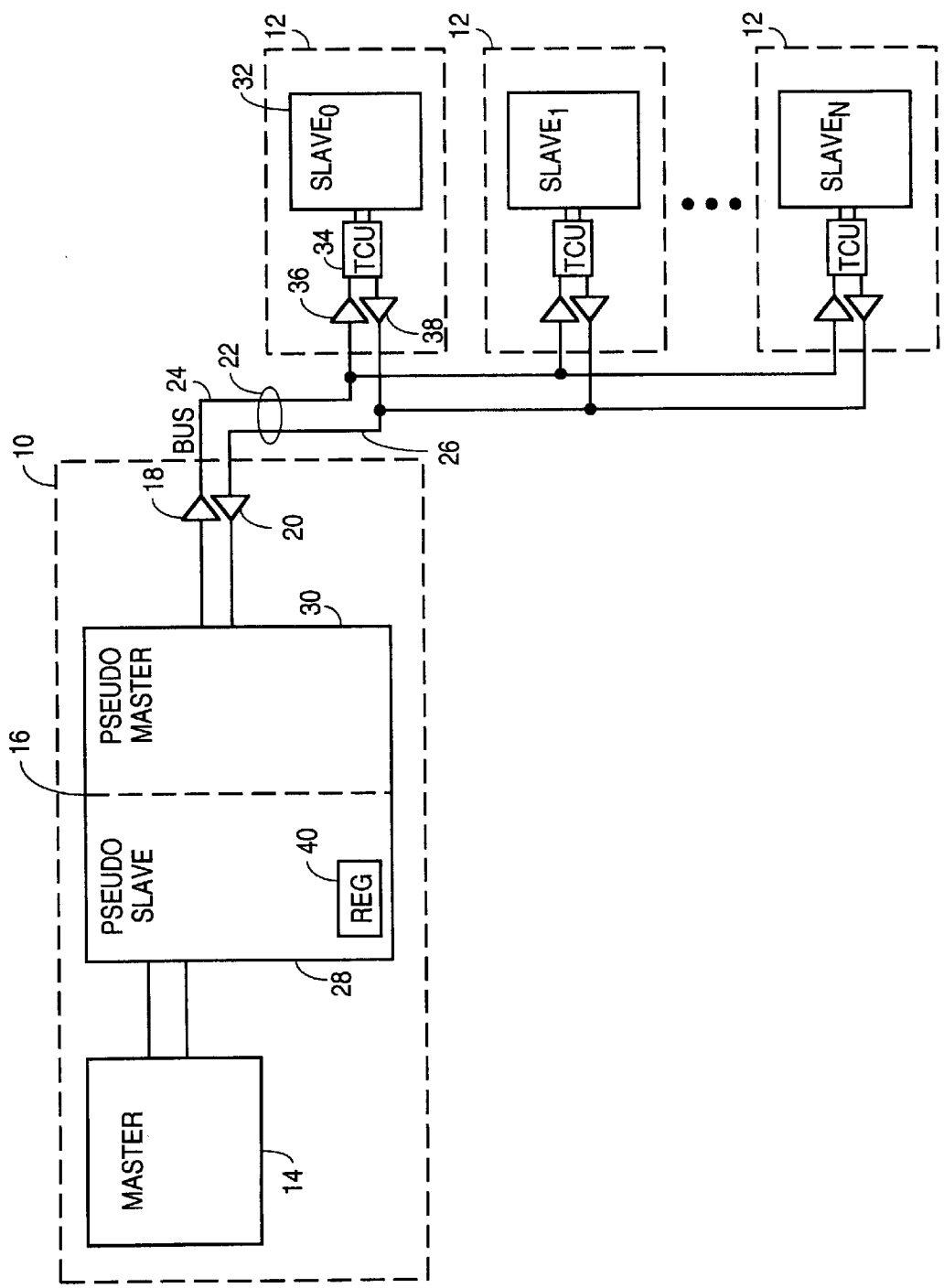
FIG. 1 is a block diagram of one embodiment of a bus system.

FIG. 1 is a block diagram of one embodiment of a bus system. A master board 10 having a master 14 thereon is coupled to a bus 22 having a transmit bus 24 and a receive bus 26 as part thereof. A plurality of slave boards 12 are coupled to a bus 22. Coupled to the master 14 on the master board 10 is a master/slave translator 16 which includes a pseudo slave 28 that communicates with master 14 and a pseudo master 30 that communicates via the bus 22 with the slave boards 12. Also on the master board are a transmit buffer 18 and a receive buffer 20 corresponding to the transmit bus 24 and receive bus 26, respectively. The slave boards 12 include a slave unit 32 coupled to a timing control unit 34 and a transmit buffer 36 and receive buffer 38 through which the slave board is coupled to the bus 22. As used herein, the slave may be any bus entity which functions as a slave of the master. This includes a wide array of I/O devices and peripherals.

In one embodiment, the master 14 employs a Utopia protocol to communicate with its slaves using ATM cells. A VHDL coding of a master/slave translator 16 of such an embodiment is attached as Appendix A. A VHDL coding of a timing control unit 34 of such an embodiment is attached as Appendix B. In this embodiment, for example, the master 14 asserts the address for $SLAVE_0$ on its local bus, then deasserts the address and expect a response during the idle time. A master/slave translator 16 is transparent to the master 14, such that the pseudo slave 28 intercepts the address request and provides a response for $SLAVE_0$. Thus, from the master's perspective, timing constraints have been satisfied. Because the pseudo slave 28 is proximate to the master, propagation delay and delay through the buffers is avoided. To ensure that the pseudo slave 28 has the current state information available when the master 14 polls, the pseudo master 30 polls all the slaves and provides the current states of each slave to a pseudo slave 28 for storage in register set 40. Initially, at startup or reset the pseudo master 30 loads the pseudo slave 28 to reflect no cells available, such that the register set 40 has data available when the master 14 begins to poll. Then, as the pseudo master performs its polling of the slaves, the actual status is loaded into the pseudo slave 28.

In performing its polling, the pseudo master 30 asserts an address, for example, on the transmit bus 24. The pseudo master 30 then deasserts the address in the next cycle and asserts a next address in the following cycle. It is during an idle cycle following assertion of the next address that the first slave having the first address will respond to the assertion of the first address. By allowing for two clock delays, the window for response has effectively been expanded for the slave to respond in a timely manner. It is the responsibility of the timing control unit 34 to drive the response in the correct time period. Notably, while the state information provided by the pseudo slave 28 to the master 14 is not real time, it is accurate current state information in the sense that the state information, once retrieved from the slaves, will not change until acted on by the master 14.

On the transmit side, the master 14 may poll all slave devices 32 and then select any available one for transfer of a cell, because unlike the polling, the transfer occurs in real time. The pseudo master 30 predicts the slave 32 that will be selected and prepares it for receipt of cell prior to the master 14 initiating the transaction. However, if the master 14 is permitted to choose a slave that was not prepared, an error occurs. Thus, the pseudo slave 28 masks the cell available response from all but one slave in any given time, thereby forcing the master 14 to select the predicted slave device 32.

The above issue with transmit does not arise in the receive context under the Utopia protocol because the master 14 is required to service a slave 32 in need. Thus, in the course of the polling, if the master 14 identifies a receive slave cell available, that slave 32 will be serviced in the next cycle. Thus, pseudo master 30 knows in advance that a particular slave 32 will be serviced and causes the slave 32 to drive its first data word of the cell into receive buffer 20 and hold the data valid until the transaction is initiated by the master 14. In this manner, the pseudo slave 28 is able to supply the master 14 data on every clock cycle within the timing budget of the master's timing protocol. In systems that do not require the master to immediately service a slave in need, a masking protocol consistent with that described above to force correct prediction on the receive side is within the scope and contemplation of the invention.

Figure 2:
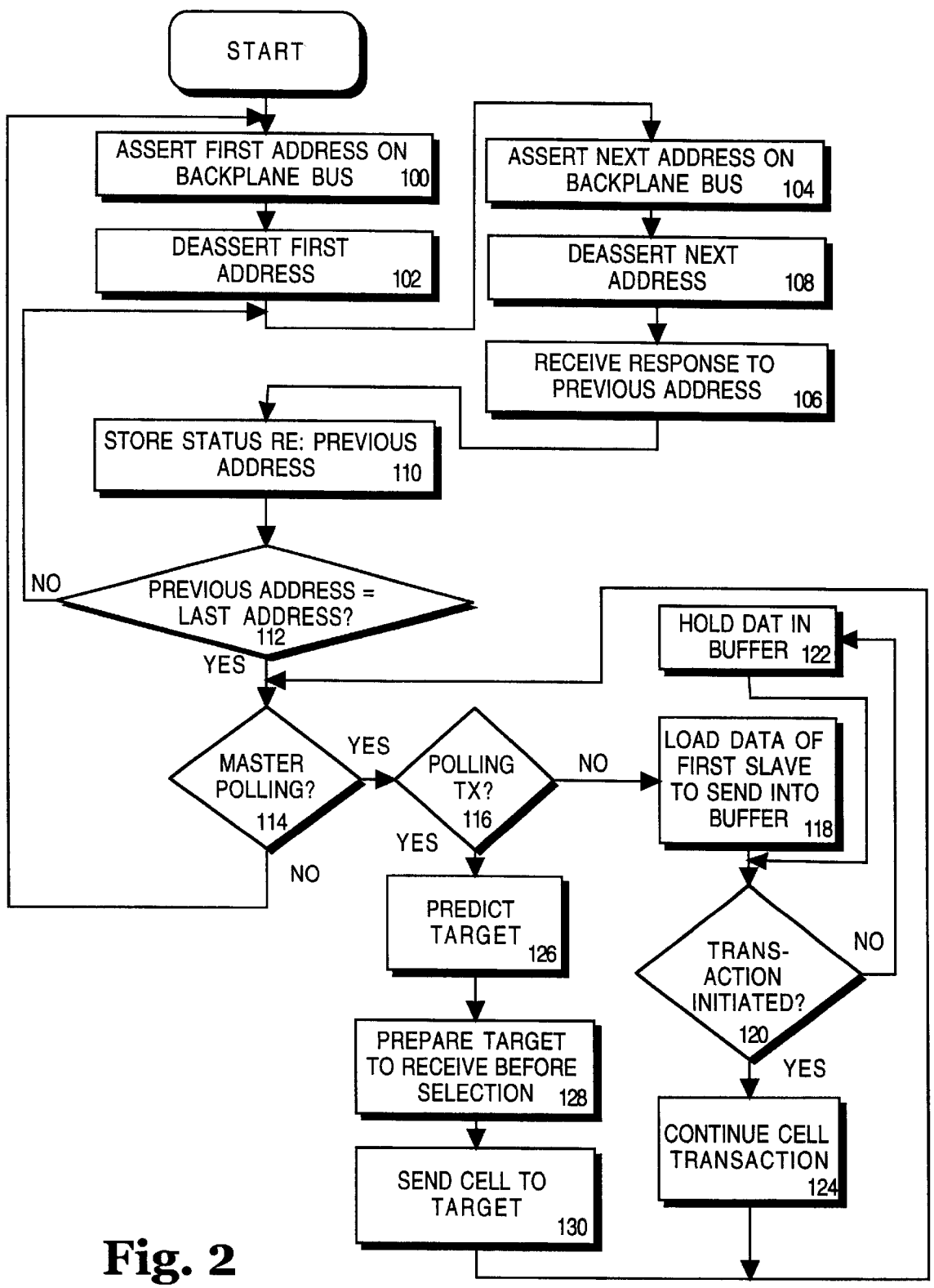
FIG. 2 is a flow chart of the operation of one embodiment of a pseudo master.

FIG. 2 is a flow chart of the operation of a pseudo master of one embodiment of the invention. The pseudo master asserts a first address on the backplane bus at functional block 100. Then at functional block 102, corresponding to the next clock cycle, the pseudo master deasserts the first address. At functional block 104 (corresponding to a third cycle) the pseudo master asserts a next address on the backplane bus. At functional block 106, the pseudo master receives a response corresponding to the previous address. Thus, if an address for $SLAVE_0$ is asserted at functional block 100, and $SLAVE_1$ is asserted at functional block 104, the assertion or non-assertion of the cell available line at functional block 106 would correspond to an availability of a cell in $SLAVE_0$.

A received response from functional block 106 is stored at functional block 110. That next address is deasserted in a next clock cycle at functional block 108. A determination is made if a previous address is the last address at decision block 112. If it is not, the master proceeds with polling the remaining addresses repeating functional blocks 104 through 110. If it is the last address, a determination is made that the master is polling at decision block 114. If the master is polling, a determination is made if it is polling the transmit bus at functional block 116. If the master is not polling the transmit bus (and it is polling), it is by implication polling the receive bus. Accordingly, the pseudo master loads data from the first slave entitled to send into the buffer on the master board at functional block 118. A determination is then made at decision block 120 if the master has initiated the transaction. If the master has not initiated the transaction, the pseudo master holds the data in the buffer. Once the transaction has been initiated the pseudo master continues to master the bus to continue the cell transaction at functional block 124. If the master is polling a transmit bus at functional block 116, the pseudo master predicts a target (which will then be forced by the pseudo slave) at functional block 126. Then at functional block 128, the pseudo master prepares that target to receive prior to its selection by the master. Then at functional block 130, the pseudo master drives the cell provided by the master to the pseudo slave out to the target slave. After the cell transactions are completed in either functional block 124 or functional block 130, the system revisits the master polling decision block 114 before repolling the slaves at functional block 100 if the master is not polling.

Figure 3:
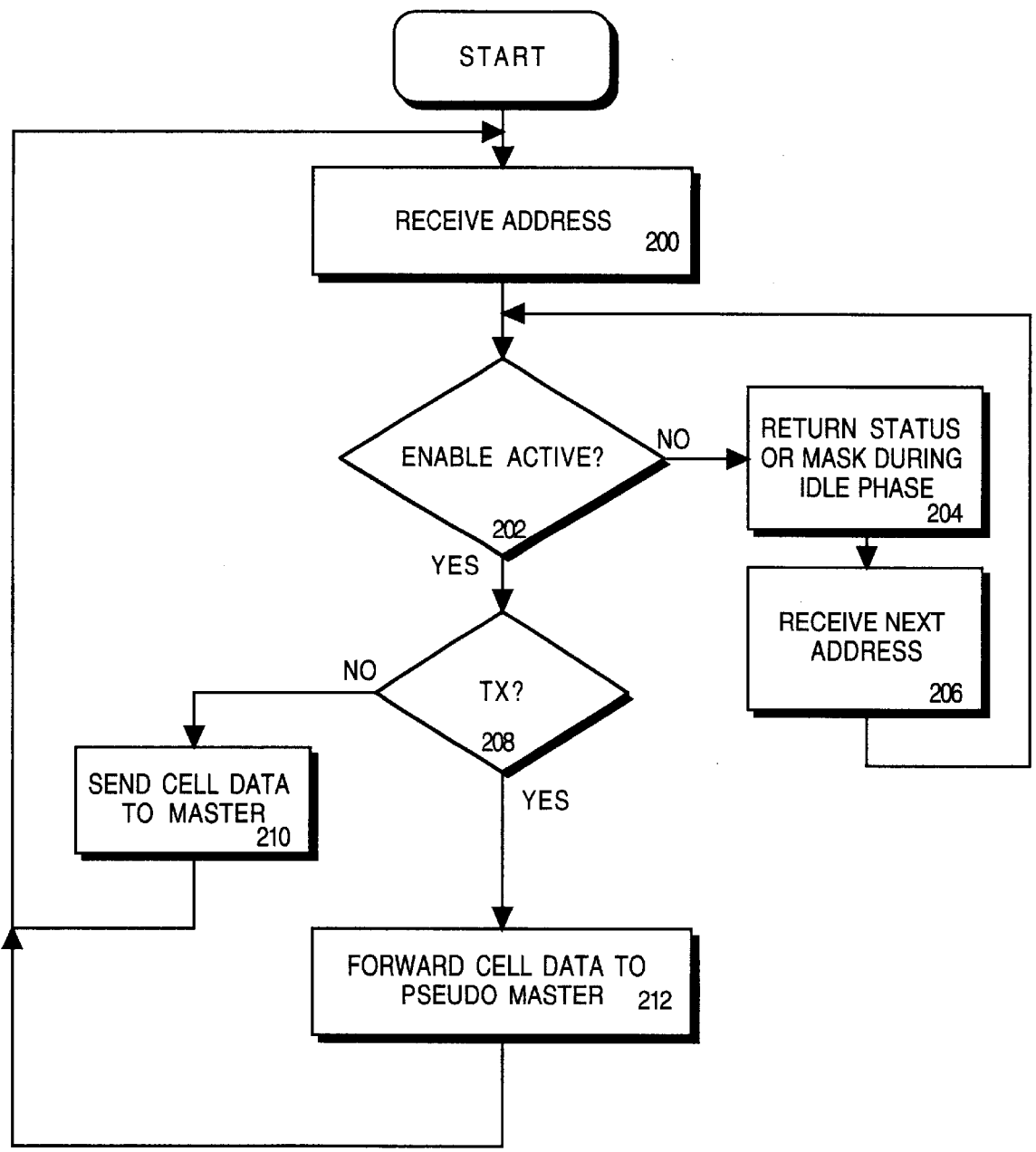
FIG. 3 is a flow diagram of operation in one embodiment of the pseudo slave.

FIG. 3 is a flow diagram of operation of one embodiment of a pseudo slave in one embodiment of the invention. At functional block 200, the pseudo slave receives an address from the master. A determination is then made at functional block 202 if the master is asserting an active enable signal on the bus. If enable is not active, then pseudo slave returns the status or mask during and immediately following idle phase at functional block 204. The pseudo slave then receives the next address at functional block 206. If the enable is active, a determination is made at decision block 208 whether the enable was asserted on the transmit bus. If the enable was inserted on the transmit bus, the pseudo slave forwards the cell data provided by the master to the pseudo master to be driven out to the respective slave. If the enable was not on the transmit bus, the pseudo slave sends the cell data residing in the transmit buffer to the master. Sending of cell data at functional block 210 continues until the entire cell has been sent. Similarly, an entire cell of data will be forwarded successively at functional block 212. After the cell is sent, the pseudo slave returns to wait for a next address asserted by the master.

Figure 4:
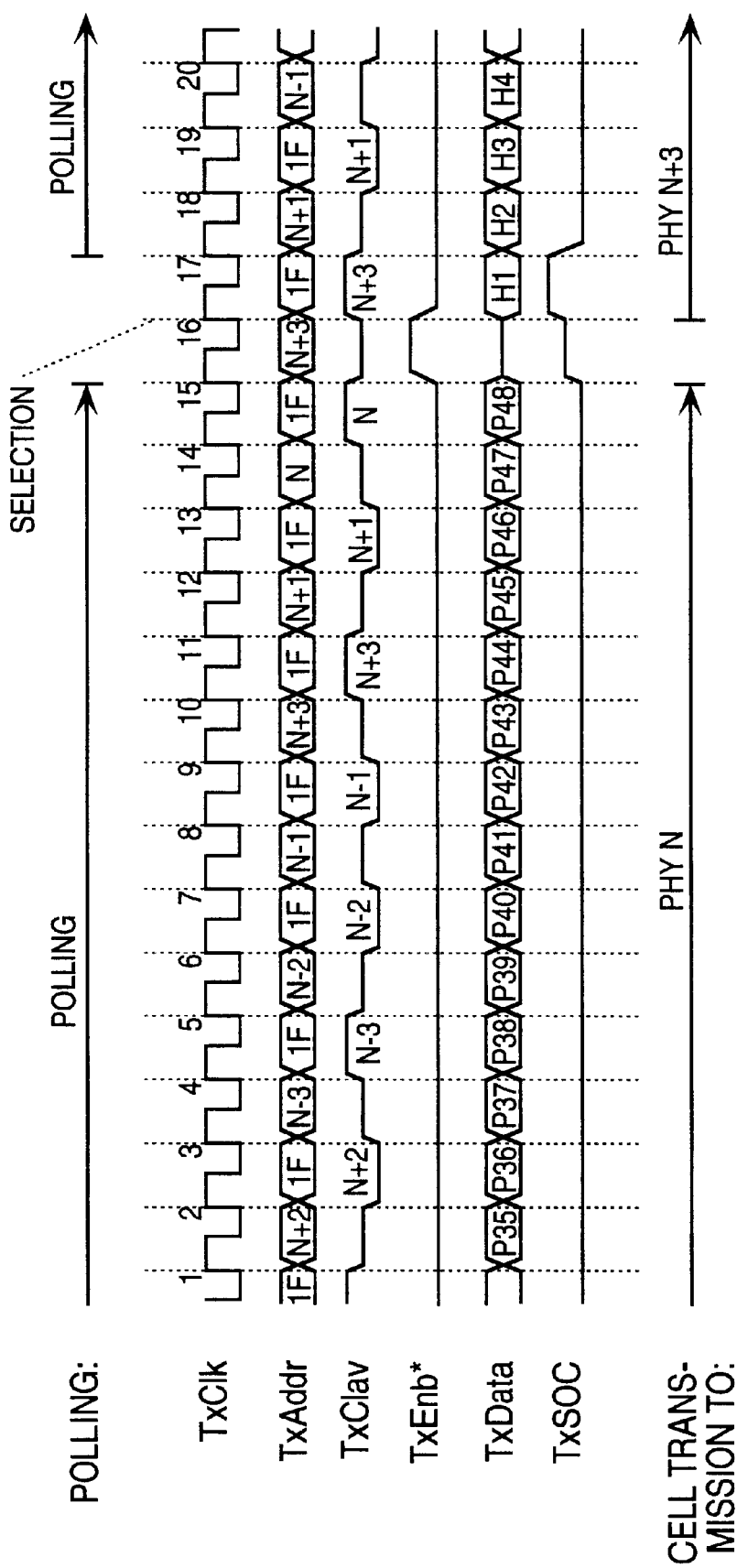
FIG. 4 is a timing diagram showing the existing timing sequence of a Utopia 2 protocol.

FIG. 4 is a timing diagram showing the existing timing sequence of a transmit bus for a Utopia 2 protocol. In one embodiment, this timing sequence is carried out between the master and the pseudo slave. As can be seen, an address is asserted on the address lines in a clock cycle, for example, cycle 2. N+2 is asserted on the address lines. Then in cycle 3, the address lines are idle and the transmit cell available is driven by the device whose address was on the transit bus in the previous cycle, in this case, N+2. Here, N+2 does not have a cell available. However, N−3 and N+3 do have cells available, as reflected further along in the polling scheme. During cycles 1–15, slave device N is receiving a cell along the data lines. Then with the rising edge of clock 16, a new device, N+3 is selected for receipt of the next cell. The master begins polling immediately after beginning transmission of the next cell to device N+3.

Figure 5:
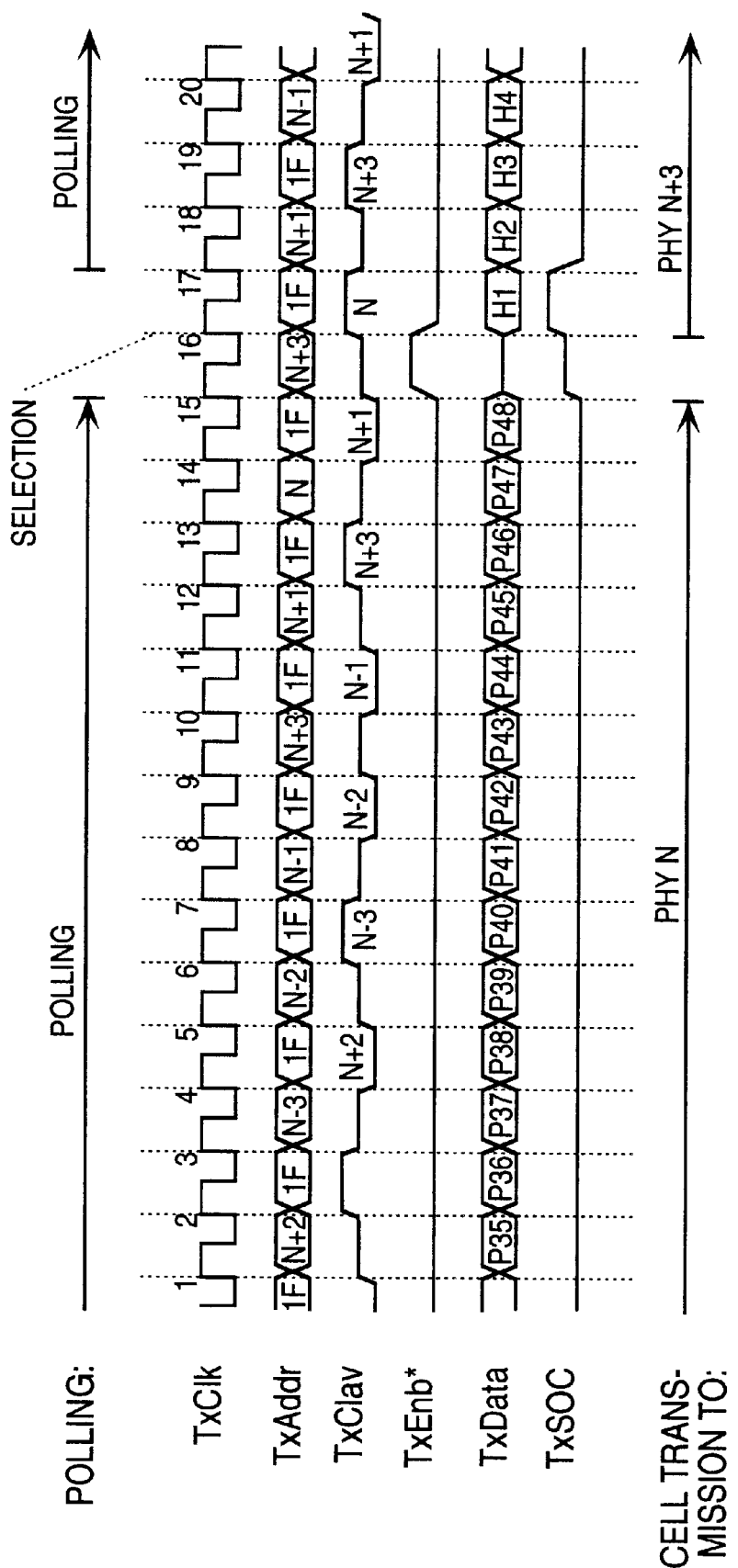
FIG. 5 is a timing diagram of one embodiment of a protocol between the pseudo master and the slave devices.

FIG. 5 shows a timing diagram of a protocol between the pseudo master and the slave devices. In this embodiment, the transmit cell available signal is delayed by one address cycle so that it is received during a next active address idle time from the assertion of the original address. Thus, the transmit cell available for N+2 asserted on the address lines in cycle 2 appears on the transmit cell available line at cycle 5 during the N−3 address idle time. The timing is otherwise analogous to that of FIG. 4. FIGS. 4 and 5 show timing for the transmit bus. Timing for the receive bus is analogous. It is noted that other embodiments may have responses received during active address times or have a plurality of address cycles between assertion of the address and a corresponding response.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:
    a pseudo slave coupled to a pseudo master to respond using a first timing protocol to signals from a master; and
    the pseudo master to execute communication with at least one slave device using a second timing protocol.

2. The apparatus of claim 1 wherein the pseudo slave comprises a register set to store status of the at least one slave device.

3. The apparatus of claim 1 wherein the pseudo slave and pseudo master are formed on a single semiconductor substrate.

4. The apparatus of claim 1 wherein the first timing protocol comprises an address phase followed by an idle phase, with a response required during the idle phase, and wherein the second timing protocol comprises an address phase followed by an idle phase with a response to a previous address phase required during a subsequent idle phase.

5. The apparatus of claim 4 wherein the first timing protocol is a Utopia protocol and the second protocol is a response shifted Utopia protocol.

6. The apparatus of claim 1 wherein the first timing protocol comprises an address phase followed by an idle phase, with a response required during the idle phase, and wherein the second timing protocol comprises an address phase followed by an idle phase with a response to a previous address phase required during a subsequent address phase.

7. A method comprising:

obtaining a status of at least one slave device in a pseudo master using a second timing protocol;

retaining the status in a pseudo slave coupled between the pseudo master and a master; and responding to the master from the pseudo slave with the status information using a first timing protocol.

8. The method of claim 7 wherein the first timing protocol and the second timing protocol are both synchronous protocols.

9. The method of claim 8 wherein both protocols operate on a same clock.

10. A method comprising:

obtaining a status of a plurality of slave devices in a pseudo master using a second timing protocol;

retaining the status in a pseudo slave coupled between the pseudo master and a master; and responding to the master from the pseudo slave with the status information using a first timing protocol; and requesting by the master a status of each slave of the plurality to determine availability of the slaves to send or receive data; and adjusting the response to the requesting master to ensure correct prediction of a next transaction.

11. The method of claim 10 further comprising:

preloading inbound data from a predicted slave into a buffer more proximate to the master than the predicted slave; and retaining the data in the buffer until a transaction is initiated by the master.

12. The method of claim 10 further comprising:

preparing a predicted slave to receive the next transaction from the master prior to selection by the master.

13. The method of claim 10 wherein adjusting comprises:

masking all but one cell available response in response to the requester by the master.

14. The method of claim 7 wherein a plurality of slave devices exist and obtaining comprises:

polling each successive slave device for its status; and receiving the status of a previous slave device while polling a subsequent slave device.

15. A system comprising:

a bus;

a slave device coupled to the bus;

a master device operating at a first timing protocol; and a master/slave translator coupled to the bus between the master device and the slave device to poll the slave device and transparently supply a slave status to the master device.

16. The system of claim 15 wherein the master/slave translator comprises:

a pseudo slave operating under a first timing protocol; and a pseudo master operating under the second timing protocol.

17. The system of claim 16 wherein the first timing protocol and second timing protocol are synchronous.

18. The system of claim 15 further comprising:

a timing control unit coupled between the slave and the bus.

19. The system of claim 16 further comprising:

a first buffer coupled between the pseudo master and the bus; and a second buffer coupled between the slave and the bus wherein for inbound transactions the pseudo master causes data from the slave to be loaded into and retained in the first buffer prior to selection of the slave by the master.

20. The system of claim 16 wherein the pseudo master polls the slave for its status independent of the master, and wherein the pseudo slave retains the status and provides the status to the master responsive to polling of the slave by the master.

* * * * *

UNITED STATES PATENT AND TRADEMARK OFFICE
CERTIFICATE OF CORRECTION

PATENT NO.    : 6,553,434 B1
DATED         : April 22, 2003
INVENTOR(S)   : Abkarian et al.

It is certified that error appears in the above-identified patent and that said Letters Patent is hereby corrected as shown below:

Insert Appendix A and B, see attached.

Signed and Sealed this

Twenty-fifth Day of November, 2003

JAMES E. ROGAN
*Director of the United States Patent and Trademark Office*

APPENDIX A

```vhdl
-- Library Clause
LIBRARY ieee;
USE ieee.std_logic_1164.ALL;
USE ieee.std_logic_arith.ALL;
USE ieee.std_logic_unsigned.ALL;

-- Entity Declaration
ENTITY u2_tx is
    PORT(
    clk            : IN     STD_LOGIC;
    clken          : IN     STD_LOGIC;
    reset_n        : IN     STD_LOGIC;
    m_u2_txclav    : IN     STD_LOGIC;
    s_u2_txsoc     : in     STD_LOGIC;
    s_u2_txclav    : in     STD_LOGIC;
    s_u2_txaddr    : in     std_logic_vector(4 downto 0);
    s_u2_txen_n    : in     STD_LOGIC;
    index1         : in     integer range 4 to 22;
    max_addr       : in     std_logic_vector(4 downto 0);

txclav_oen     : inout  std_logic;
    m_u2_txsoc     : in     STD_LOGIC;
    m_u2_txen_n    : in     STD_LOGIC;
    tx_next_n      : out    STD_LOGIC;
    u2_addr_m      : inout  std_logic_vector(4 downto 0);
    sl_u2_txclav   : inout  STD_LOGIC );
END u2_tx;

-- Architecture Body
ARCHITECTURE UTOPIA OF u2_tx IS type s_type is (poll,sel,xfr,idle);
    signal st: s_type;
    signal  m_txclav     :STD_LOGIC_VECTOR(22 downto 4);
    signal  s_txaddr     :STD_LOGIC_VECTOR(4 downto 0);
    signal  m_u2_addr    :STD_LOGIC_VECTOR(4 downto 0);
    signal  index2       : integer range 4 to 22;
    signal  s_txen       : STD_LOGIC;
    signal  tx_update    : STD_LOGIC;
    signal  cycle        :STD_LOGIC_VECTOR(4 downto 0);
    signal  no_poll      : STD_LOGIC;
    signal  no_clav      : STD_LOGIC;

begin tx:process(clk, reset_n,s_u2_txaddr,s_txaddr,m_u2_addr,st,m_txclav,sl_u2_txclav,max_addr,index2,s_txen)

begin
```

```vhdl
            index2 <= CONV_INTEGER(s_txaddr);

case st is
            when poll =>
                    case (s_txen and not(clken)) is
                        when '1' =>
                                u2_addr_m <= m_u2_addr;
                        when '0' => u2_addr_m <= "11111";
                        when others => u2_addr_m <= "11111";
                    end case;
            when xfr =>
                    u2_addr_m <= m_u2_addr;
            when others =>
            -       u2_addr_m <= "11111";
    end case;

s1_u2_txclav <= m_txclav(index2);

if reset_n = '0' then
        m_txclav  <= "0000000000000000000";
        m_u2_addr <= "00100";
        tx_next_n   <= '1';
        st <= poll;
        s_txaddr <= "11111";
        txclav_oen <= '0';
        tx_update <= '0';
        s_txen <= '1';
        cycle <= "10100";
        no_poll <= '0';
        no_clav <= '0';

else if (clk'EVENT AND clk = '1') then

--              tx_update <= s_txen and not(clken);
--              tx_update <= (s_txen and ((clken and not(tx_update)) or tx_update));

no_poll <= not(cycle(4)) and not(cycle(3)) and not(cycle(2)) and not(cycle(1)) and
not(cycle(0));
                no_clav <=  (not(s_txaddr(4)) and not(s_txaddr(3)) and not(s_txaddr(2)) and
not(s_u2_txen_n) and s_txen and not(no_clav))
                            or
                            (no_clav and not(s_u2_txen_n));
                s_txaddr <= s_u2_txaddr;
                s_txen <= (s_u2_txen_n and ((clken and not(s_txen)) or s_txen));

if ((s_txen = '1') and (clken = '0') and (st = poll)) then
                    tx_update <= '1';
                else
                    tx_update <= '0';
                end if;
```

```
             then
                                    cycle <= "10100";
--                         else if ((s_u2_txen_n = '0') and (s_txen = '0') and (no_poll = '0')) then
                           else if ((s_u2_txen_n = '0') and (s_txen = '0') and (cycle /= "00000")) then
                                    cycle <= cycle - 1;
                           else
                                    cycle <= cycle;
                           end if;
                    end if;

if ((s1_u2_txclav = '1') and (s_u2_txclav = '1')) then
--                  if ((s1_u2_txclav = '1') and (no_poll = '0')) then
--                  if (s1_u2_txclav = '1') then
                           m_u2_addr <= s_txaddr;
                    else if ((clken = '1') and (st = poll) and (s_txen = '1')) then
                           if (m_u2_addr = max_addr) then
                                    m_u2_addr <= "00100";
                           else
                                    m_u2_addr <= m_u2_addr+1;
                           end if;
                    else
                           m_u2_addr <= m_u2_addr;
                    end if;
                    end if;

txclav_oen <=    (
                                         (
                                         (s_u2_txaddr(4) or s_u2_txaddr(3) or s_u2_txaddr(2))
                                         and
                                         (not(s_u2_txaddr(4) and s_u2_txaddr(3) and s_u2_txaddr(2)))
                                         and not(no_poll)
                                         )
                                    or
--                                       (not(s_u2_txaddr(4)) and not(s_u2_txaddr(3)) and not(s_u2_txaddr(2))
and not(s_u2_txen_n))
                                         (not(s_u2_txaddr(4)) and not(s_u2_txaddr(3)) and not(s_u2_txaddr(2))
and no_clav)
                                         );

if (max_addr /= "00000") then case st is when poll =>
                           if ((s1_u2_txclav = '1') and (s_u2_txclav = '1')) then
--                         if ((s1_u2_txclav = '1') and (no_poll = '0')) then
--                         if (s1_u2_txclav = '1') then
                                 st <= sel;
                                 tx_next_n <= '0';
                           else
                                 st <= poll;
                                 if (tx_update = '1') then
```

```vhdl
                              if ((s_txen = '1') and (clken = '1') and (tx_update = '1')) then
                                  case m_u2_addr is
                                      when "00100" =>
                                          m_txclav(index1) <= not(m_u2_txclav);
                                      when "00101" =>
                                          m_txclav(4) <= not(m_u2_txclav);
                                      when "00110" =>
                                          m_txclav(5) <= not(m_u2_txclav);
                                      when "00111" =>
                                          m_txclav(6) <= not(m_u2_txclav);
                                      when "01000" =>
                                          m_txclav(7) <= not(m_u2_txclav);
                                      when "01001" =>
                                          m_txclav(8) <= not(m_u2_txclav);
                                      when "01010" =>
                                          m_txclav(9) <= not(m_u2_txclav);
                                      when "01011" =>
                                          m_txclav(10) <= not(m_u2_txclav);
                                      when "01100" =>
                                          m_txclav(11) <= not(m_u2_txclav);
                                      when "01101" =>
                                          m_txclav(12) <= not(m_u2_txclav);
                                      when "01110" =>
                                          m_txclav(13) <= not(m_u2_txclav);
                                      when "01111" =>
                                          m_txclav(14) <= not(m_u2_txclav);
                                      when "10000" =>
                                          m_txclav(15) <= not(m_u2_txclav);
                                      when "10001" =>
                                          m_txclav(16) <= not(m_u2_txclav);
                                      when "10010" =>
                                          m_txclav(17) <= not(m_u2_txclav);
                                      when "10011" =>
                                          m_txclav(18) <= not(m_u2_txclav);
                                      when "10100" =>
                                          m_txclav(19) <= not(m_u2_txclav);
                                      when "10101" =>
                                          m_txclav(20) <= not(m_u2_txclav);
                                      when "10110" =>
                                          m_txclav(21) <= not(m_u2_txclav);
                                      when others =>
                                          m_txclav <= m_txclav;
                                  end case;
                              end if;
                          end if;

--              when sel =>
--                  if (s_txaddr(4) = '1' or s_txaddr(3) = '1' or s_txaddr(2) = '1') then
--                      if (s_u2_txen_n = '0') then
--                          st <= sel;
--                      else
--                          st <= xfr;
--                      end if;
--                  else
--                      st <= idle;
--                      tx_next_n <= '1';
```

```
                                end if;
                    when sel =>
                        if (s_txaddr(4) = '0' and s_txaddr(3) = '0' and s_txaddr(2) = '0' and s_u2_txclav =
    then
                            st <= idle;
                            tx_next_n <= '1';
                        else
                            if (s_u2_txen_n = '0') then
                                st <= sel;
                            else
                                st <= xfr;
                            end if;
                        end if;

when xfr =>
                        if (
                            ((s_u2_txen_n = '1') and (s_txaddr(4) = '1' or s_txaddr(3) = '1' or s_txaddr(2) =
1'))
                            or
                            ((s_txaddr(4) = '0' and s_txaddr(3) = '0' and s_txaddr(2) = '0') and s_u2_txclav =
0')
                            ) then
                            st <= xfr;
                        else
                            st <= idle;
                            tx_next_n <= '1';
                            m_txclav(index2) <= '0';
                        end if;

when idle =>
                        tx_next_n <= '1';
                            if ((m_u2_txclav = '1') and (go_poll = '1')) then
                            if ((m_u2_txclav = '1') and (s_txen = '0')) then
                                st <= poll;
                            end if;

when others =>
                        st <= poll;
                end case;
            end if;
        end if;
        end if;

end process tx;

END UTOPIA;
```

```vhdl
    -- Library Clause
LIBRARY ieee;
USE ieee.std_logic_1164.ALL;
USE ieee.std_logic_arith.ALL;
USE ieee.std_logic_unsigned.ALL;

-- Entity Declaration
ENTITY u2_rcv is
    PORT(
        clk             :IN     STD_LOGIC;
        clken           :IN     STD_LOGIC;
        reset_n         :IN     STD_LOGIC;
        m_u2_rxclav     :IN     STD_LOGIC;

s_u2_rxaddr     :in     std_logic_vector(4 downto 0);
        s_u2_rxen_n     :in     STD_LOGIC;
        m_u2_rxsoc      :in     STD_LOGIC;
        index1          :in     integer range 4 to 22;
        max_addr        :in     std_logic_vector(4 downto 0);

rxclav_oen      :inout  std_logic;
        rx_oen          :out    std_logic;
        s_u2_rxsoc      :out    STD_LOGIC;
        m_u2_rxen_n     :inout  STD_LOGIC;
        rcv_next_n      :out    STD_LOGIC;
        u2_addr_m       :inout  std_logic_vector(4 downto 0);
        s1_u2_rxclav    :inout  STD_LOGIC );
END u2_rcv;

-- Architecture Body
ARCHITECTURE UTOPIA OF u2_rcv IS type s_type is (poll,sel,xfr,idle);
    signal st: s_type;
    signal  m_rxclav        :STD_LOGIC_VECTOR(22 downto 4);
    signal  s_rxaddr        :STD_LOGIC_VECTOR(4 downto 0);
    signal  m_u2_addr       :STD_LOGIC_VECTOR(4 downto 0);
    signal  index2          : integer range 4 to 22;
    signal  m_d_rxen        : STD_LOGIC;
    signal  s_rxen          : STD_LOGIC;
    signal  xfrbit          : STD_LOGIC;
    signal  rx_update       : STD_LOGIC;

begin rcv:process(clk,
reset_n,s_u2_rxaddr,s_rxaddr,m_u2_addr,st,m_rxclav,s1_u2_rxclav,m_d_rxen,max_addr,index1,xfrbit)

begin
```

```vhdl
        index2 <= CONV_INTEGER(s_rxaddr);

case st is
            when poll =>
                    case (s_rxen and not(clken) and m_u2_rxen_n) is
                        when '1' =>
                                u2_addr_m <= m_u2_addr;
                        when '0' => u2_addr_m <= "11111";
                        when others => u2_addr_m <= "11111";
                    end case;
            when xfr =>
                    u2_addr_m <= m_u2_addr;
            when others =>
                    u2_addr_m <= "11111";
end case;

case s_rxaddr is
    when "00100" => sl_u2_rxclav <= m_rxclav(4);
    when "00101" => sl_u2_rxclav <= m_rxclav(5);
    when "00110" => sl_u2_rxclav <= m_rxclav(6);
    when "00111" => sl_u2_rxclav <= m_rxclav(7);
    when "01000" => sl_u2_rxclav <= m_rxclav(8);
    when "01001" => sl_u2_rxclav <= m_rxclav(9);
    when "01010" => sl_u2_rxclav <= m_rxclav(10);
    when "01011" => sl_u2_rxclav <= m_rxclav(11);
    when "01100" => sl_u2_rxclav <= m_rxclav(12);
    when "01101" => sl_u2_rxclav <= m_rxclav(13);
    when "01110" => sl_u2_rxclav <= m_rxclav(14);
    when "01111" => sl_u2_rxclav <= m_rxclav(15);
    when "10000" => sl_u2_rxclav <= m_rxclav(16);
    when "10001" => sl_u2_rxclav <= m_rxclav(17);
    when "10010" => sl_u2_rxclav <= m_rxclav(18);
    when "10011" => sl_u2_rxclav <= m_rxclav(19);
    when "10100" => sl_u2_rxclav <= m_rxclav(20);
    when "10101" => sl_u2_rxclav <= m_rxclav(21);
    when "10110" => sl_u2_rxclav <= m_rxclav(22);
    when others => sl_u2_rxclav <= '0';
end case;

rx_oen <= m_u2_rxen_n;

if reset_n = '0' then
    m_rxclav <= "000000000000000000";
    m_u2_addr <= "00100";
    s_u2_rxsoc <= '0';
    rcv_next_n <= '1';
    st <= idle;
    s_rxaddr <= "11111";
```

```vhdl
                m_d_rxen <= '1';
                m_u2_rxen_n <= '1';
                s_rxen <= '1';
                xfrbit <= '0';
                rx_oen <= '1';
                rxclav_oen <= '0';
                rx_update <= '0';

else if (clk'EVENT AND clk = '1') then s_rxaddr <= s_u2_rxaddr;
                s_rxen <= (s_u2_rxen_n and ((clken and not(s_rxen)) or s_rxen));
                m_d_rxen <= m_u2_rxen_n;

--      rx_update <= (s_rxen and ((clken and not(rx_update)) or rx_update));
--      rx_update <= s_rxen and not(clken);

if ((s_rxen = '1') and (clken = '0') and (st = poll)) then
                    rx_update <= '1';
                else
                    rx_update <= '0';
                end if;

m_u2_rxen_n <= (
                    (s_u2_rxen_n and s_rxen and not(m_u2_rxen_n))
                    or
                    (s_u2_rxen_n and s_u2_rxaddr(4) and s_u2_rxaddr(3) and s_u2_rxaddr(2) and xfrbit)
                    or
                    (m_u2_rxen_n and not(xfrbit))
                    );

if (sl_u2_rxclav = '1') then
                    m_u2_addr <= s_rxaddr;
                else if  ((clken = '1') and (st = poll) and (s_rxen = '1')) then
                        if (m_u2_addr = max_addr) then
                            m_u2_addr <= "00100";
                        else
                            m_u2_addr <= m_u2_addr+1;
                        end if;
                else
                    m_u2_addr <= m_u2_addr;
                end if;
                end if;

rxclav_oen <= (
                    (s_u2_rxaddr(4) or s_u2_rxaddr(3) or s_u2_rxaddr(2))
                    and (not(s_u2_rxaddr(4) and s_u2_rxaddr(3) and s_u2_rxaddr(2)))
                  );

if (max_addr /= "00000") then case st is
```

```vhdl
    when poll =>
        if (s1_u2_rxclav = '1') then
            st <= sel;
        else
            st <= poll;
            if ((s_rxen = '1') and (clken = '1') and (rx_update = '1')) then
            if (rx_update = '1') then
                        case m_u2_addr is
                            when "00100" =>
                                m_rxclav(index1) <= not(m_u2_rxclav);
                            when "00101" =>
                                m_rxclav(4) <= not(m_u2_rxclav);
                            when "00110" =>
                                m_rxclav(5) <= not(m_u2_rxclav);
                            when "00111" =>
                                m_rxclav(6) <= not(m_u2_rxclav);
                            when "01000" =>
                                m_rxclav(7) <= not(m_u2_rxclav);
                            when "01001" =>
                                m_rxclav(8) <= not(m_u2_rxclav);
                            when "01010" =>
                                m_rxclav(9) <= not(m_u2_rxclav);
                            when "01011" =>
                                m_rxclav(10) <= not(m_u2_rxclav);
                            when "01100" =>
                                m_rxclav(11) <= not(m_u2_rxclav);
                            when "01101" =>
                                m_rxclav(12) <= not(m_u2_rxclav);
                            when "01110" =>
                                m_rxclav(13) <= not(m_u2_rxclav);
                            when "01111" =>
                                m_rxclav(14) <= not(m_u2_rxclav);
                            when "10000" =>
                                m_rxclav(15) <= not(m_u2_rxclav);
                            when "10001" =>
                                m_rxclav(16) <= not(m_u2_rxclav);
                            when "10010" =>
                                m_rxclav(17) <= not(m_u2_rxclav);
                            when "10011" =>
                                m_rxclav(18) <= not(m_u2_rxclav);
                            when "10100" =>
                                m_rxclav(19) <= not(m_u2_rxclav);
                            when "10101" =>
                                m_rxclav(20) <= not(m_u2_rxclav);
                            when "10110" =>
                                m_rxclav(21) <= not(m_u2_rxclav);
                            when others =>
                                m_rxclav <= m_rxclav;
                        end case;
                        end if;
        end if;

when sel =>
        rcv_next_n <= '0';
        if (s_u2_rxen_n = '0') then
            st <= sel;
        else
```

```vhdl
                                st <= xfr;
                                xfrbit <= '1'
                            end if;

when xfr =>
                        if (s_u2_rxen_n = '1') then
                            st <= xfr;
                            xfrbit <= '1';
                        else
                            st <= idle;
                            rcv_next_n <= '1';
                            m_rxclav(index2) <= '0';
                            xfrbit <= '0';
                            s_u2_rxsoc <= '1';
                        end if;

when idle =>
                        s_u2_rxsoc <= '0';
                                if (m_u2_rxclav = '1') then
                                    st <= poll;
                                end if;

when others =>
                            st <= poll;
                end case;
            end if;
        end if;
    end if;

end process rcv;

END UTOPIA;
```

```vhdl
-- ................\RX_FIFO\RU2_M.vhd
-- VHDL code created by Visual Software Solution's StateCAD Version 4.0
-- Thu Jun 11 17:32:34 1998

-- This VHDL code (for use with Model Technology) was generated using:
-- one-hot state assignment with boolean code format.
-- Minimization is enabled, implied else is enabled,
-- and outputs are manually optimized.

LIBRARY ieee;
USE ieee.std_logic_1164.all;

ENTITY RU2_M IS
    PORT (ru2_clk,ru2_ff_done,ru2_ren,ru2_sel,rx_reset: IN std_logic;
        ru2_bclr0,ru2_cnt_en,ru2_vc_oe2 : OUT std_logic);
END;

ARCHITECTURE BEHAVIOR OF RU2_M IS
-- State variables for machine sreg
    SIGNAL FF_DONE, next_FF_DONE, FF_ST, next_FF_ST, IDLE_IF, next_IDLE_IF, UDF,
        next_UDF, VC2_OE, next_VC2_OE : std_logic;
BEGIN
    PROCESS (ru2_clk, rx_reset, next_FF_DONE, next_FF_ST, next_IDLE_IF, next_UDF
        , next_VC2_OE)
    BEGIN
        IF ( rx_reset='1' ) THEN
            FF_DONE <= '0';
            FF_ST <= '0';
            IDLE_IF <= '1';
            UDF <= '0';
            VC2_OE <= '0';
        ELSIF ru2_clk='1' AND ru2_clk'event THEN
            FF_DONE <= next_FF_DONE;
            FF_ST <= next_FF_ST;
            IDLE_IF <= next_IDLE_IF;
            UDF <= next_UDF;
            VC2_OE <= next_VC2_OE;
        END IF;
    END PROCESS;

PROCESS (FF_DONE,FF_ST,IDLE_IF,ru2_ff_done,ru2_ren,ru2_sel,UDF,VC2_OE)
    BEGIN IF (( ru2_ff_done='1' AND  (FF_ST='1'))) THEN next_FF_DONE<='1';
        ELSE next_FF_DONE<='0';
        END IF;

IF (( ru2_ff_done='0' AND  (FF_ST='1')) OR (  (UDF='1'))) THEN
            next_FF_ST<='1';
        ELSE next_FF_ST<='0';
        END IF;

IF ((  (FF_DONE='1')) OR ( ru2_sel='0' AND  (IDLE_IF='1')) OR ( ru2_ren='0'
            AND  (IDLE_IF='1'))) THEN next_IDLE_IF<='1';
        ELSE next_IDLE_IF<='0';
        END IF;

IF (( ru2_ren='0' AND  (VC2_OE='1'))) THEN next_UDF<='1';
        ELSE next_UDF<='0';
        END IF;

IF (( ru2_sel='1' AND ru2_ren='1' AND  (IDLE_IF='1')) OR ( ru2_ren='1' AND
            (VC2_OE='1'))) THEN next_VC2_OE<='1';
        ELSE next_VC2_OE<='0';
        END IF;
```

```
               IF ((   (UDF='1',,) THEN ru2_bclr0<='1';
               ELSE ru2_bclr0<='0';
70             END IF;

IF ((   (FF_ST='1')) OR (   (UDF='1'))) THEN ru2_cnt_en<='1';
               ELSE ru2_cnt_en<='0';
               END IF;
75
               IF ((   (VC2_OE='1'))) THEN ru2_vc_oe2<='1';
               ELSE ru2_vc_oe2<='0';
               END IF;
          END PROCESS;
80   END BEHAVIOR;
```

```vhdl
--      C:\HARUN\FIFO48\RX_FIFO\T2_M.vhd
--      VHDL code created by Visual Software Solution's StateCAD Version 4.0
--      Thu Aug 27 18:30:45 1998

--      This VHDL code (for use with Model Technology) was generated using:
--      one-hot state assignment with boolean code format.
--      Minimization is enabled,  implied else is enabled,
--      and outputs are manually optimized.

LIBRARY ieee;
USE ieee.std_logic_1164.all;

ENTITY T2_M IS
    PORT (t2_clk,t2_bstat0,t2_cmp_done,t2_cnt_bit5,t2_ff_done,t2_match,t2_reset,
        t2_sel,t2_soc,t2_ten: IN std_logic;
        t2_buf0_av,t2_clr_clav,t2_cmp_req,t2_cnt_clr,t2_cnt_en,t2_cnt_load,t2_vc1,
            t2_vc2,vc2_d : OUT std_logic);
END;

ARCHITECTURE BEHAVIOR OF T2_M IS
--  State variables for machine sreg
    SIGNAL T2_CLK_VC1, next_T2_CLK_VC1, T2_CLK_VC2, next_T2_CLK_VC2, T2_FF_ST,
        next_T2_FF_ST, T2_FIFO_DONE, next_T2_FIFO_DONE, T2_IDLE, next_T2_IDLE,
        T2_PIPE_D, next_T2_PIPE_D, T2_UDF, next_T2_UDF, T2_WAIT, next_T2_WAIT,
        T2_XL_DONE, next_T2_XL_DONE, T2FF_XL_DONE, next_T2FF_XL_DONE, T2VC_BAD1,
        next_T2VC_BAD1, T2VC_BAD2, next_T2VC_BAD2, T2VC_GOOD1, next_T2VC_GOOD1 :
        std_logic;
BEGIN
    PROCESS (t2_clk, t2_reset, next_T2_CLK_VC1, next_T2_CLK_VC2, next_T2_FF_ST,
        next_T2_FIFO_DONE, next_T2_IDLE, next_T2_PIPE_D, next_T2_UDF, next_T2_WAIT,
        next_T2_XL_DONE, next_T2FF_XL_DONE, next_T2VC_BAD1, next_T2VC_BAD2,
        next_T2VC_GOOD1)
    BEGIN
        IF ( t2_reset='1' ) THEN
            T2_CLK_VC1 <= '0';
            T2_CLK_VC2 <= '0';
            T2_FF_ST <= '0';
            T2_FIFO_DONE <= '0';
            T2_IDLE <= '1';
            T2_PIPE_D <= '0';
            T2_UDF <= '0';
            T2_WAIT <= '0';
            T2_XL_DONE <= '0';
            T2FF_XL_DONE <= '0';
            T2VC_BAD1 <= '0';
            T2VC_BAD2 <= '0';
            T2VC_GOOD1 <= '0';
        ELSIF t2_clk='1' AND t2_clk'event THEN
            T2_CLK_VC1 <= next_T2_CLK_VC1;
            T2_CLK_VC2 <= next_T2_CLK_VC2;
            T2_FF_ST <= next_T2_FF_ST;
            T2_FIFO_DONE <= next_T2_FIFO_DONE;
            T2_IDLE <= next_T2_IDLE;
            T2_PIPE_D <= next_T2_PIPE_D;
            T2_UDF <= next_T2_UDF;
            T2_WAIT <= next_T2_WAIT;
            T2_XL_DONE <= next_T2_XL_DONE;
            T2FF_XL_DONE <= next_T2FF_XL_DONE;
            T2VC_BAD1 <= next_T2VC_BAD1;
            T2VC_BAD2 <= next_T2VC_BAD2;
            T2VC_GOOD1 <= next_T2VC_GOOD1;
        END IF;
    END PROCESS;

PROCESS (t2_bstat0,T2_CLK_VC1,T2_CLK_VC2,t2_cmp_done,t2_cnt_bit5,t2_ff_done,
        T2_FF_ST,T2_FIFO_DONE,T2_IDLE,t2_match,T2_PIPE_D,t2_sel,t2_soc,t2_ten,T2_UDF
        T2_WAIT,T2_XL_DONE,T2FF_XL_DONE,T2VC_BAD1,T2VC_BAD2,T2VC_GOOD1)
```

```vhdl
 70         IF (( t2_sel='0' AND  (T2_CLK_VC1='1')) OR ( t2_ten='1' AND  (
                T2_CLK_VC1='1')) OR ( t2_soc='0' AND  (T2_CLK_VC1='1')) OR ( t2_bstat0='
                AND  (T2_IDLE='1'))) THEN next_T2_CLK_VC1<='1';
            ELSE next_T2_CLK_VC1<='0';
            END IF;
 75
            IF (( t2_sel='1' AND t2_ten='0' AND t2_soc='1' AND  (T2_CLK_VC1='1'))) THEN
                   next_T2_CLK_VC2<='1';
            ELSE next_T2_CLK_VC2<='0';
            END IF;
 80
            IF (( t2_ff_done='0' AND t2_cmp_done='0' AND  (T2_FF_ST='1')) OR (  (
                T2_PIPE_D='1'))) THEN next_T2_FF_ST<='1';
            ELSE next_T2_FF_ST<='0';
            END IF;
 85
            IF (( t2_ff_done='1' AND t2_cmp_done='0' AND  (T2_FF_ST='1')) OR (
                t2_cmp_done='0' AND  (T2_FIFO_DONE='1'))) THEN next_T2_FIFO_DONE<='1';
            ELSE next_T2_FIFO_DONE<='0';
            END IF;
 90
            IF (( t2_bstat0='1' AND  (T2_IDLE='1')) OR (  (T2VC_BAD1='1')) OR (  (
                T2VC_BAD2='1')) OR (  (T2VC_GOOD1='1'))) THEN next_T2_IDLE<='1';
            ELSE next_T2_IDLE<='0';
            END IF;
 95
            IF ((  (T2_UDF='1'))) THEN next_T2_PIPE_D<='1';
            ELSE next_T2_PIPE_D<='0';
            END IF;

100         IF ((  (T2_CLK_VC2='1'))) THEN next_T2_UDF<='1';
            ELSE next_T2_UDF<='0';
            END IF;

IF (( t2_ff_done='1' AND t2_cmp_done='1' AND  (T2_FF_ST='1')) OR (
105             t2_ff_done='1' AND  (T2_XL_DONE='1'))) THEN next_T2_WAIT<='1';
            ELSE next_T2_WAIT<='0';
            END IF;

IF (( t2_ff_done='0' AND t2_cmp_done='1' AND  (T2_FF_ST='1')) OR (
110             t2_ff_done='0' AND  (T2_XL_DONE='1'))) THEN next_T2_XL_DONE<='1';
            ELSE next_T2_XL_DONE<='0';
            END IF;

IF (( t2_cmp_done='1' AND  (T2_FIFO_DONE='1')) OR (  (T2_WAIT='1'))) THEN
115             next_T2FF_XL_DONE<='1';
            ELSE next_T2FF_XL_DONE<='0';
            END IF;

IF (( t2_match='0' AND t2_cnt_bit5='1' AND  (T2FF_XL_DONE='1'))) THEN
120             next_T2VC_BAD1<='1';
            ELSE next_T2VC_BAD1<='0';
            END IF;

IF (( t2_match='0' AND t2_cnt_bit5='0' AND  (T2FF_XL_DONE='1'))) THEN
125             next_T2VC_BAD2<='1';
            ELSE next_T2VC_BAD2<='0';
            END IF;

IF (( t2_match='1' AND  (T2FF_XL_DONE='1'))) THEN next_T2VC_GOOD1<='1';
130         ELSE next_T2VC_GOOD1<='0';
            END IF;

IF ((  (T2VC_GOOD1='1'))) THEN t2_buf0_av<='1';
```

```
135         ELSE t2_buf0_av<='0';
            END IF;

IF ((  (T2_CLK_VC2='1'))) THEN t2_clr_clav<='1';
            ELSE t2_clr_clav<='0';
140         END IF;

IF ((  (T2_UDF='1'))) THEN t2_cmp_req<='1';
            ELSE t2_cmp_req<='0';
            END IF;
145
            IF ((  (T2VC_BAD1='1'))) THEN t2_cnt_clr<='1';
            ELSE t2_cnt_clr<='0';
            END IF;

150         IF ((  (T2_FF_ST='1')) OR (  (T2_XL_DONE='1'))) THEN t2_cnt_en<='1';
            ELSE t2_cnt_en<='0';
            END IF;

IF ((  (T2VC_BAD2='1'))) THEN t2_cnt_load<='1';
155         ELSE t2_cnt_load<='0';
            END IF;

IF ((  (T2_CLK_VC1='1'))) THEN t2_vc1<='1';
            ELSE t2_vc1<='0';
160         END IF;

IF ((  (T2_CLK_VC2='1'))) THEN t2_vc2<='1';
            ELSE t2_vc2<='0';
            END IF;
165
            IF ((  (T2_UDF='1'))) THEN vc2_d<='1';
            ELSE vc2_d<='0';
            END IF;
        END PROCESS;
170 END BEHAVIOR;
```